United States Patent
Yanagisawa et al.

(10) Patent No.: US 12,541,167 B2
(45) Date of Patent: Feb. 3, 2026

(54) DRIVE TRANSMISSION DEVICE, IMAGE READING DEVICE, AND IMAGE FORMING APPARATUS

(71) Applicants: Kimiharu Yanagisawa, Tokyo (JP); Shinya Takai, Kanagawa (JP); Ryohei Morisaki, Kanagawa (JP); Takehisa Shimazu, Kanagawa (JP); Hiroshi Kubo, Kanagawa (JP); Shinya Kitaoka, Kanagawa (JP)

(72) Inventors: Kimiharu Yanagisawa, Tokyo (JP); Shinya Takai, Kanagawa (JP); Ryohei Morisaki, Kanagawa (JP); Takehisa Shimazu, Kanagawa (JP); Hiroshi Kubo, Kanagawa (JP); Shinya Kitaoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 210 days.

(21) Appl. No.: 18/416,398

(22) Filed: Jan. 18, 2024

(65) Prior Publication Data

US 2024/0255881 A1 Aug. 1, 2024

(30) Foreign Application Priority Data

Jan. 31, 2023 (JP) .................................. 2023-012470
Sep. 7, 2023 (JP) .................................. 2023-145235

(51) Int. Cl.
*H04N 1/04* (2006.01)
*G03G 15/00* (2006.01)
*H04N 1/00* (2006.01)

(52) U.S. Cl.
CPC ..... *G03G 15/6529* (2013.01); *H04N 1/00588* (2013.01)

(58) Field of Classification Search
USPC ............................................. 358/498, 496
See application file for complete search history.

(56) References Cited

U.S. PATENT DOCUMENTS

2007/0121176 A1 5/2007 Yamazaki et al.
2009/0015709 A1 1/2009 Kimura et al.
(Continued)

FOREIGN PATENT DOCUMENTS

JP 2006-352393 A 12/2006
JP 2013-106244 A 5/2013

*Primary Examiner* — Cheukfan Lee
(74) *Attorney, Agent, or Firm* — Harness, Dickey & Pierce, P.L.C.

(57) ABSTRACT

A drive transmission device includes a plurality of drive transmission units and a heat-resistant member. The drive transmission units include a plurality of drive transmission mechanisms to transmit drive force from a plurality of drive sources to a driven member. At least two drive sources of the drive sources are included in at least two drive transmission units of the drive transmission units. The at least two drive sources are disposed at substantially a same height and on a same side with respect to at least two drive transmission mechanisms of the drive transmission mechanisms that correspond to the at least two drive sources. The heat-resistant member is disposed at a position higher than the at least two drive sources in a use state. The at least two drive transmission mechanisms are shielded from the at least two drive sources by the heat-resistant member at the position.

7 Claims, 15 Drawing Sheets

(56) References Cited

U.S. PATENT DOCUMENTS

| | | |
|---|---|---|
| 2009/0316039 A1 | 12/2009 | Yoshida et al. |
| 2010/0027081 A1 | 2/2010 | Sano et al. |
| 2010/0225983 A1 | 9/2010 | Fujii et al. |
| 2012/0002252 A1 | 1/2012 | Kubo et al. |
| 2012/0057212 A1 | 3/2012 | Tobinaga et al. |
| 2012/0314267 A1 | 12/2012 | Suzuki et al. |
| 2013/0215481 A1 | 8/2013 | Hayasaka et al. |
| 2013/0242359 A1 | 9/2013 | Heishi et al. |
| 2014/0177012 A1 | 6/2014 | Kubo et al. |
| 2015/0256701 A1 | 9/2015 | Kimura et al. |
| 2015/0334273 A1 | 11/2015 | Yanagisawa |
| 2016/0198059 A1 | 7/2016 | Kubo et al. |
| 2017/0366696 A1* | 12/2017 | Koyanagi ............ B65H 3/0653 |
| 2020/0137262 A1 | 4/2020 | Kubo et al. |
| 2020/0244837 A1 | 7/2020 | Tsukahara et al. |
| 2020/0252513 A1 | 8/2020 | Nakada et al. |
| 2020/0296255 A1 | 9/2020 | Hashimoto et al. |
| 2020/0336615 A1 | 10/2020 | Ono et al. |
| 2022/0094815 A1 | 3/2022 | Heishi et al. |

\* cited by examiner

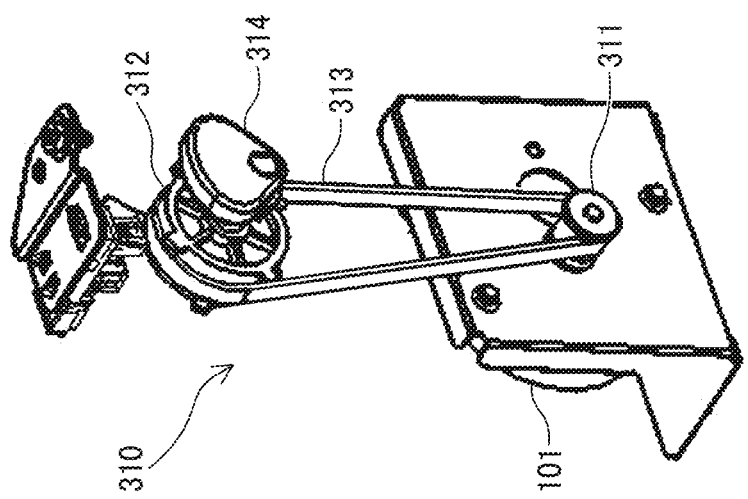
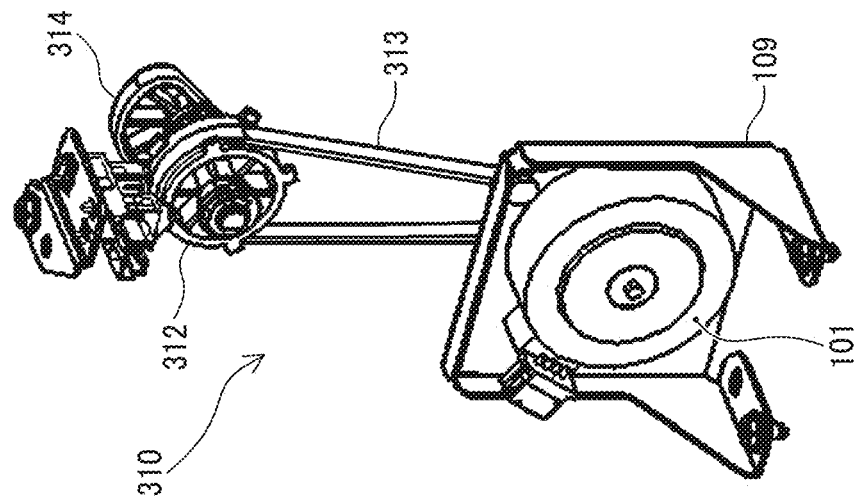

DRIVE TRANSMISSION DEVICE, IMAGE READING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2023-012470, filed on Jan. 31, 2023, and 2023-145235, filed on Sep. 7, 2023, in the Japan Patent Office, the entire disclosure of each of which is hereby incorporated by reference herein.

BACKGROUND

Technical Field

Embodiments of the present disclosure relate to a drive transmission device, an image reading device, and an image forming apparatus.

Related Art

A drive transmission device is known that include a plurality of drive transmission units to transmit driving forces from drive sources to driven members, using drive transmission mechanisms.

For example, a drive transmission device provided in an automatic document reader has been suggested. This drive transmission device includes a plurality of drive transmission units that transmit driving forces from motors (drive sources) to driven members such as a pickup roller and a conveyance roller, using drive transmission mechanisms including gears and the like. A drive transmission unit that transmits a driving force to a conveyance roller includes a driving gear attached to a motor shaft, and a swing gear meshing with the driving gear. The swing gear is rotatably supported by a holder. The holder covers about two thirds of the circumference of the tooth flank from the upper portion to the lower portion of the swing gear, and functions as a safety cover that prevents the user from directly touching the gear tooth flank.

SUMMARY

According to an embodiment of the present disclosure, a drive transmission device includes a plurality of drive transmission units and a heat-resistant member. The plurality of drive transmission units include a plurality of drive sources and a plurality of drive transmission mechanisms. The plurality of drive transmission mechanisms transmit drive force from the plurality of drive sources to a driven member. At least two drive sources of the plurality of drive sources are included in at least two drive transmission units of the plurality of drive transmission units. The at least two drive sources are disposed at substantially a same height and on a same side with respect to at least two drive transmission mechanisms of the plurality of drive transmission mechanisms that correspond to the at least two drive sources. The heat-resistant member is disposed at a position higher than the at least two drive sources in a use state. The at least two drive transmission mechanisms are shielded from the at least two drive sources by the heat-resistant member at the position.

According to another embodiment of the present disclosure, an image reading device includes the drive transmission device.

According to still another embodiment of the present disclosure, an image forming apparatus includes the drive transmission device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11A is a rear perspective view of drive transmission mechanisms of a pickup motor according to an embodiment of the present disclosure;

FIG. 11B is a front perspective view of the drive transmission mechanisms of the pickup motor of FIG. 11A;

Figure 1:
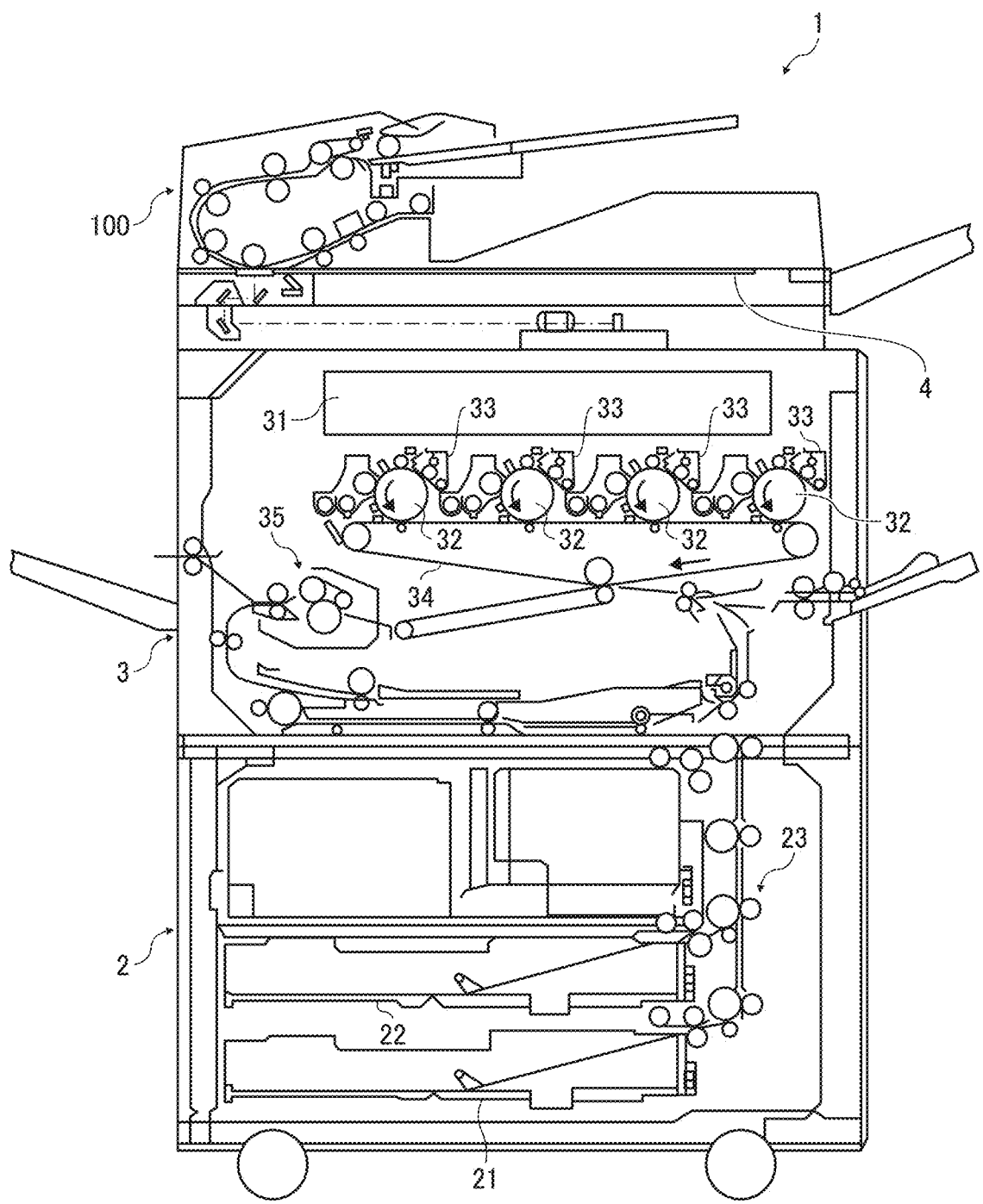
FIG. 1 is a schematic diagram illustrating a configuration of a copier serving as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The following is a description of some embodiments of the present disclosure, with reference to the drawings.

In I following examples described herein, a drive transmission device according to an embodiment of the present disclosure is applied to an automatic document feeder (ADF) as an automatic sheet feeder, an image reading device, and an image forming apparatus.

FIG. 1 is a schematic diagram illustrating a configuration of a copier 1 serving as an image forming apparatus according to an embodiment of the present disclosure.

The copier 1 includes an automatic document feeder (ADF) 100, a sheet feeding device 2, and an image forming device 3.

The sheet feeding device 2 includes sheet trays 21 and 22 and sheet conveyors 23. Transfer sheets (sheets) as recording media having different sizes are accommodated in the sheet trays 21 and 22. The sheet conveyors 23 are formed with various rollers that convey the transfer sheets stored in the sheet trays 21 and 22 to the image forming device 3.

The image forming device 3 includes an exposure device 31, photoconductor drums 32 for four colors, developing devices 33, a transfer belt 34, and a fixing device 35.

In the image forming device 3, the exposure device 31 exposes the photoconductor drums 32 with light to form latent images in the respective colors on the photoconductor drums 32, on the basis of image data of an original document read by an image reader disposed inside the ADF 100.

Subsequently, the developing devices 33 for the respective colors supply toners of the respective colors onto the photoconductor drums 32, to develop the latent images on the photoconductor drums 32 to visible toner images.

The image forming device 3 then transfers the toner images from the respective photoconductor drums 32 onto the transfer belt 34 to form a composite color image. The image forming device 3 further transfers the composite color image onto a recording sheet supplied from the sheet feeding device 2, and fuses the toner of the composite color image with the fixing device 35, to fix the composite color image to the recording sheet.

Figure 2:
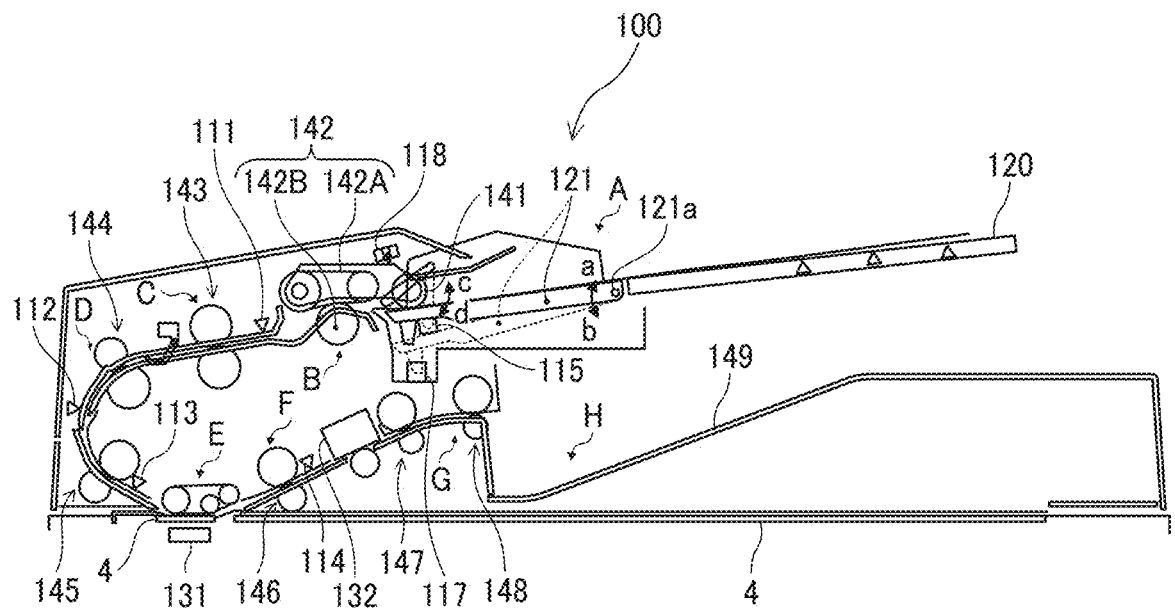
FIG. 2 is a schematic diagram illustrating a configuration of an automatic document feeder (ADF) according to an embodiment of the present disclosure.

FIG. 2 is a schematic diagram illustrating a configuration of the ADF 100 having the functions of an image reading device.

Figure 3:
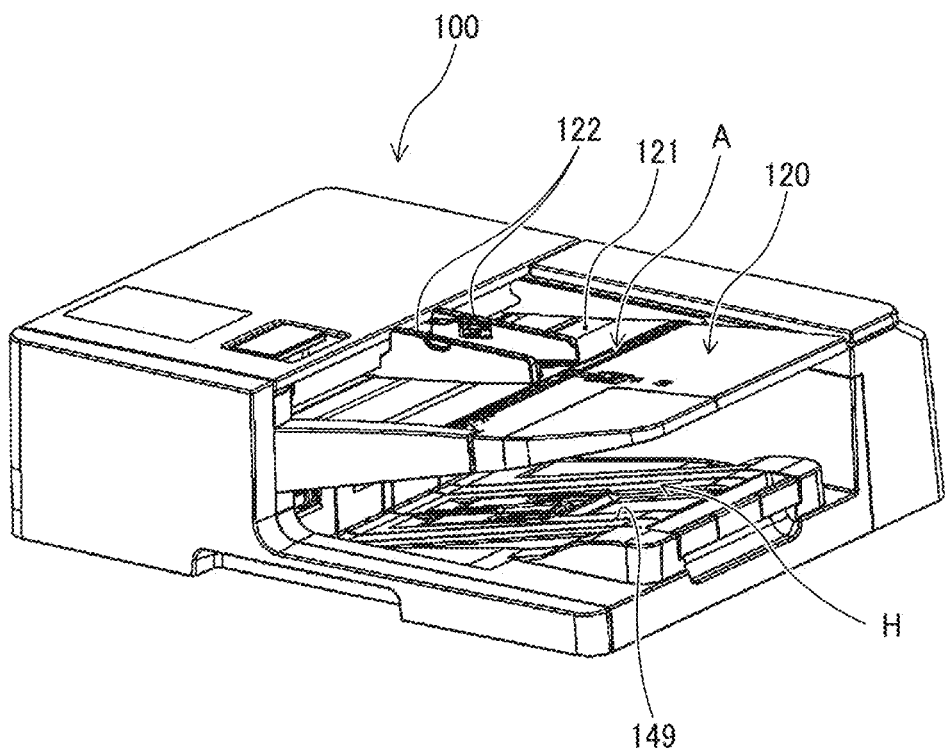
FIG. 3 is a front perspective view of the ADF illustrated in FIG. 2.

FIG. 3 is a front perspective view of the ADF 100.

Figure 4:
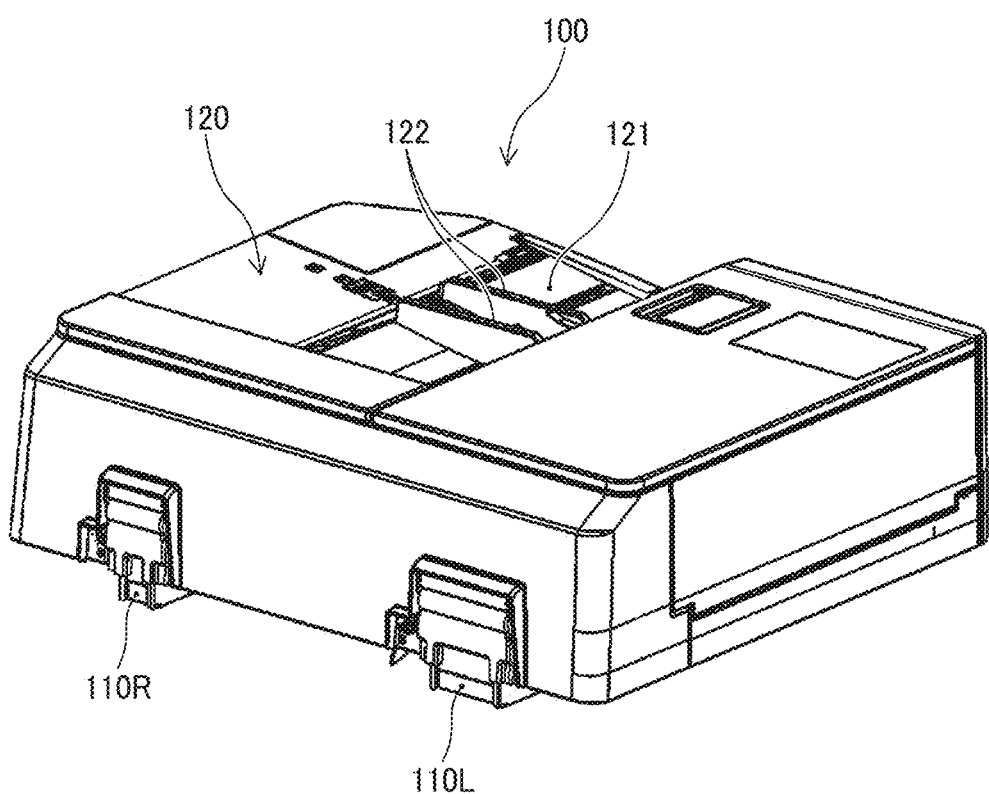
FIG. 4 is a rear perspective view of the ADF illustrated in FIG. 2.

FIG. 4 is a rear perspective view of the ADF 100.

As illustrated in FIG. 1, the ADF 100 is attached to an upper portion of the copier 1.

The ADF 100 includes a document setting section A, a sheet separation section B, a registration section C, a sheet turning section D, a first reading section E, a second reading section F, a sheet ejection section G, and a sheet stacking section H. A document stack is set on the document setting section A. The sheet separation section B separates and feeds original documents one by one from the document stack set on the document setting section A. The registration section C brings the original document into contact with a roller pair to be primarily aligned, and conveys the aligned original document by drawing out from the roller pair. The sheet turning section D turns the original document being conveyed, so that the document face is positioned opposite to the document reading side (the lower side in the drawing) of a first image reader 131. The first reading section E is a section where the first image reader 131 reads an image on the front face of the original document from below an exposure glass 4. The second reading section F is a section where a second image reader 132 reads an image on the back face of the original document after the image on the front side of the original document has been read. The sheet ejection section G is a section from which the original document is ejected to the outside of the ADF 100 after completion of reading the images on the front and back faces of the original document. The sheet stacking section H stacks and holds the ejected original documents.

A single original document or a stack of two or more original documents to be read is set on the document setting section A. The stack of two or more original documents is collectively referred to as the "document stack". The document stack is set on a document table 120 serving as a stacker including a movable document table 121.

In the present embodiment, the exposure glass 4 formed with a light-transmissive member is disposed on the upper face of the housing of the copier 1, and the ADF 100 is disposed adjacent to the exposure glass 4. The ADF 100 is rotatable (openable and closable) so as to open and close the exposure glass 4 via hinge members 110R and 110L.

The ADF 100 is compatible with both a sheet-through reading method (an automatic conveyance mode) and a fixed document reading method (a pressure plate mode). The sheet-through reading method is a method to read an image with one or both of the first image reader 131 and the second image reader 132, while the original document to be read is conveyed at a predetermined speed, with the first image reader 131 secured. The fixed document reading method is a method to read an image of the original document to be read, while moving the first image reader 131 along the exposure glass 4, with the original document placed on the exposure glass 4.

An operation panel 5 (see FIG. 5) serving as an operation receiver that receives a user operation is operated, so that an operation mode can be set as desired to the copier 1 according to the present embodiment. The operation mode may be the automatic conveyance mode (the ADF mode) in which an original document is read by the fixed document reading method described above, or the pressure plate mode in which an original document is read by the sheet-through reading method described above, for example.

Figure 5:
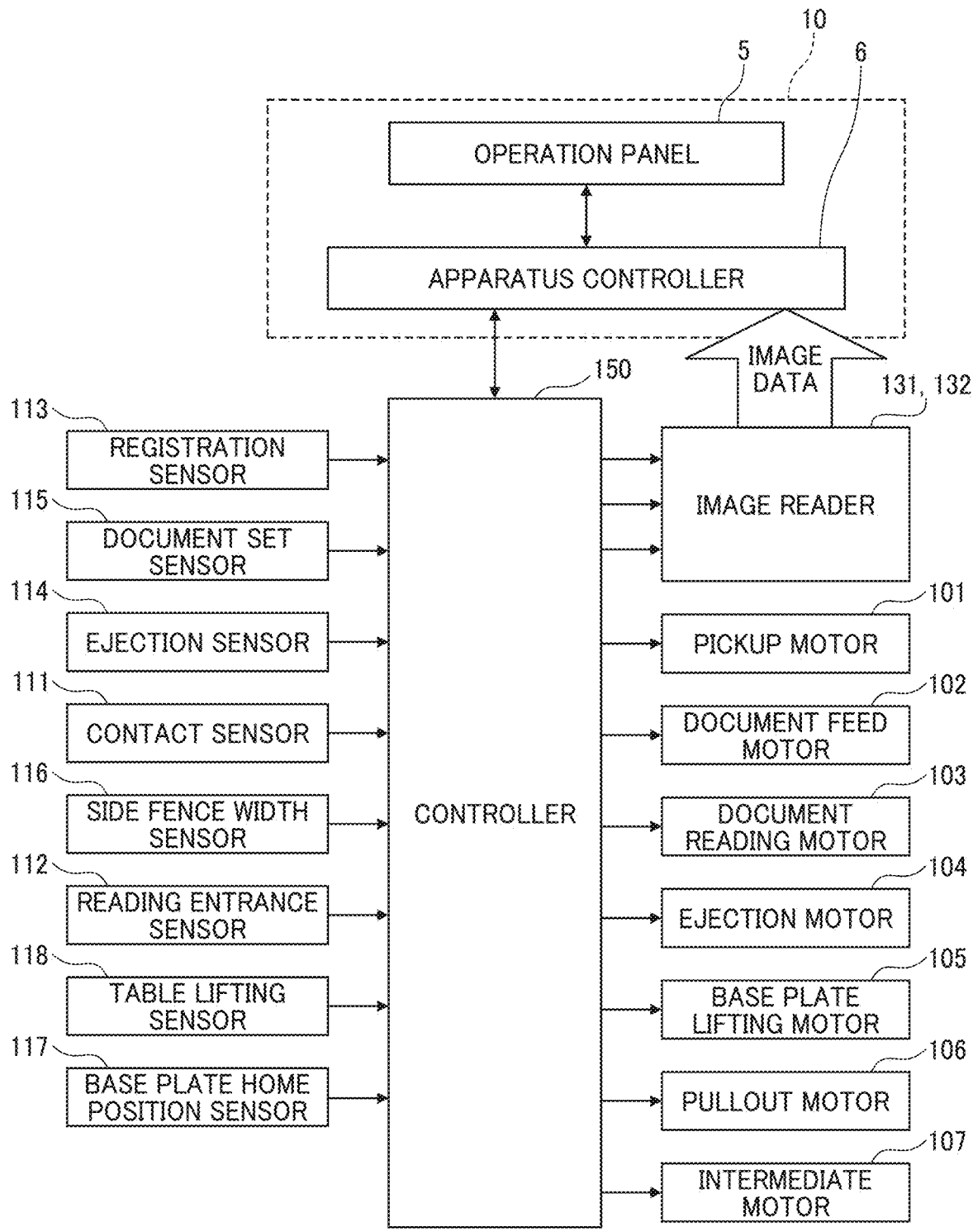
FIG. 5 is a block diagram illustrating a configuration of a controller in an ADF according to an embodiment of the present disclosure.

FIG. 5 is a block diagram illustrating a configuration of a controller incorporated in the ADF 100, according to an embodiment of the present disclosure.

As illustrated in FIG. 5, the ADF 100 also includes various motors 101 to 107 as drive sources for performing driving for document feeding operations (document conveying operations) at the respective mechanisms A to H, and a controller 150 that controls various operations including operations of the various motors 101 to 107.

The controller 150 supplies power to each section in the ADF 100, and controls each section in the ADF 100 on the basis of a control signal transmitted from an apparatus controller 6 disposed in the housing of the copier 1.

When an image on an original document is read by the fixed document reading method, the original document is set on the exposure glass 4, and the ADF 100 is closed. The ADF 100 includes a pressure plate at the bottom to press the original document against the exposure glass 4 when the image on the original document is read by the fixed document reading method. When a document reading instruction operation is performed on the operation panel 5 with the ADF 100 being closed, the original document is read while the first image reader 131 moves in the lateral direction in FIG. 1. By the fixed document reading method, a gate signal is sent from the controller 150 to the first image reader 131 every time reading of one A4 document is completed, for example, and thus, reading control is performed.

When an image on an original document is read by the sheet-through reading method, a document stack is set on the document table 120 (as a stacker) including the movable document table 121 with the document face (the first face) facing up. Further, side fences 122 serving as a restraint restrict the width direction of the document stack (a direction orthogonal to the document conveying direction), so as to position the side fences 122 (positioning of the side fences 122) by aligning with the width direction of the document stack. The setting (set state) of the document stack is detected by a document set sensor 115 disposed on the movable document table 121. The result of the detection performed by the document set sensor 115 is sent to the apparatus controller 6 via an interface (I/F).

The movable document table (base plate) 121 is supported so that the rear end of the movable document table 121 (the rear side in the document feeding direction) can rotate about a rotary shaft 121*a*. The movable document table 121 rotates about the rotary shaft 121*a* by a base plate lifting motor 105 serving as a switcher, so that the leading end of the movable document table 121 (the front side in the document feeding direction) can be raised or lowered.

Before a document is placed on the document table 120, the movable document table 121 of the document table 120 is located at a home position (a position indicated by a dashed line in FIG. 2) that is a lowered position. The user sets the document stack on the document table 120 while the movable document table 121 is at the home position. At this point of time, the uppermost face of the document stack on the movable document table 121 at the home position is separated from a pickup roller 141.

When the document set sensor 115 detects that the document stack is now set, the controller 150 rotates the base plate lifting motor 105 in a forward direction to raise the movable document table 121 so that the uppermost face of the document stack on the movable document table 121 is brought into contact with the pickup roller 141 serving as a sheet feeding member. When the movable document table 121 moves upward to push up the pickup roller 141 with the upper face of the document stack on the movable document table 121, a table lifting sensor 118 detects this state. The controller 150 having received this detection signal stops the driving of the base plate lifting motor 105, so that the movable document table 121 is stopped at an appropriate position.

In other words, the table lifting sensor 118 detects that the movable document table 121 has reached an appropriate position, and holds the upper face of the document stack at an appropriate height. More specifically, when the table lifting sensor 118 is turned on, the movable document table 121 stops moving upward. After that, the feeding of the document stack is repeated. When the position of the upper face of the document stack is lowered, and the table lifting sensor 118 is turned off, the movable document table 121 moves upward again. When the table lifting sensor 118 is turned on again, the movable document table 121 stops moving upward. As such a control operation is repeated, the position of the upper face of the document stack (the highest position of the original document) is maintained within a height range suitable for document feeding.

When the whole document stack set on the document table 120 is fed, the document set sensor 115 turns off. The controller 150 causes the base plate lifting motor 105 to rotate in reverse to lower the movable document table 121 to the home position so that the subsequent document stack can be set on the document table 120. In the present embodiment, a base plate home position sensor 117 is disposed to detect that the movable document table 121 is at the home position. With the base plate home position sensor 117, the controller 150 can determine whether the movable document table 121 is at the home position.

When a document reading instruction operation (a feed start instruction) is performed on the operation panel 5, a document feed signal (a feed start signal) is transmitted from the apparatus controller 6 to the controller 150 via an interface. In response to this, a document feeding operation is started. A document feed motor 102 rotates in the forward direction to rotate the pickup roller 141 while the top face of the document stack on the movable document table 121 is maintained at an appropriate height for document feeding, so that some original documents (ideally, one original document) on the document table 120 are picked up. The rotational direction at this point of time is the direction in which the uppermost original document is conveyed toward the downstream side in the feeding direction. A separation mechanism 142 includes a feeding belt 142A and a reverse roller 142B facing the feeding belt 142A. The feeding belt 142A is rotationally driven in the feeding direction by forward rotation of the document feed motor 102, and the reverse roller 142B is rotationally driven in the direction opposite to the feeding direction by forward rotation of the document feed motor 102.

One original document separated by the separation mechanism 142 is further conveyed by the feeding belt 142A, and, after the leading end is detected by a contact sensor 111, the original document further advances and comes into contact with a pullout roller pair 143 that is in a stopped state. The original document is then conveyed by a distance determined beforehand on the basis of the detection time of the contact sensor 111, so that the leading end of the original document is pressed with a given amount of bend against the pullout roller pair 143. The document feed motor 102 is stopped in this state, so that the driving of the feeding belt 142A conveying the original document is stopped.

In response to the detection of the leading end of the original document by the contact sensor 111, the controller 150 causes a pickup motor 101 to rotate, to retract the pickup roller 141 from the top face of the original document. Accordingly, the original document is conveyed by the conveying force of the feeding belt 142A of the separation mechanism 142. Because of such an operation, the leading end of the original document enters the nip region of the pullout roller pair 143, so that the leading end of the original document is aligned (skew correction). The pullout roller pair 143 is rollers that have a skew correction function, and conveys, to an intermediate roller pair 144, an original document subjected to skew correction after separation. The pullout roller pair 143 is driven by a pullout motor 106. The intermediate roller pair 144 is driven by an intermediate motor 107. When the pullout roller pair 143 is driven, the intermediate roller pair 144 is driven, but the pickup roller 141 and the feeding belt 142A are not driven.

The contact sensor 111 detects, from a motor pulse, the leading end and the trailing end of the original document to detect the length of the original document in the document conveying direction. When the original document is conveyed from the registration section C to the sheet turning section D by driving of the pullout roller pair 143 and the intermediate roller pair 144, the conveyance speed of the original document at the registration section C is set to be higher than the conveyance speed of the original document at the first reading section E, so that the processing time for feeding the original document to the first reading section E can be shortened. When the leading end of the original document is detected by a reading entrance sensor 112, deceleration of the original document is started to make the document conveyance speed equal to the reading conveyance speed before the leading end of the original document enters the nip region of a reading entrance roller pair 145. At the same time, a document read motor 103 is driven to rotate in the forward direction to drive the reading entrance roller pair 145, a first reading exit roller pair 146, and a second reading exit roller pair 147.

When the leading end of the original document is detected with a registration sensor 113, the controller 150 causes the original document to temporarily stop before the first reading section E, and transmits a registration stop signal to the apparatus controller 6 via the interface. Subsequently, when the controller 150 receives a reading start signal from the apparatus controller 6, the controller 150 increases the conveyance speed of the original document, which has been stopped, to a predetermined conveyance speed, and conveys the original document until the leading end of the original document arrives at the first reading section E. The controller 150 transmits a gate signal indicating an effective image area of the first face of the original document in the sub-scanning direction, to the first image reader 131 at the time when the leading end of the original document detected with the pulse count of the document read motor 103 arrives at the first reading section E. The gate signal is continuously transmitted until the trailing end of the original document passes through the first reading section E.

In the case of single-sided document reading, the original document that has passed through the first reading section E is conveyed to the sheet ejection section G through the second reading section F. At this point of time, when an ejection sensor 114 detects the leading end of the original document, the controller 150 rotationally drives an ejection motor 104 in the forward direction, to rotate an ejection roller pair 148. Further, the controller 150 counts the pulse of the ejection motor 104 after the leading end of the document is detected by the ejection sensor 114, lowers the speed of driving of the ejection motor 104 immediately before the trailing end of the document passes through the nip region of the ejection roller pair 148, and performs control so that the document ejected onto an ejected sheet tray 149 of the sheet stacking section H does not stick out.

In the case of double-sided document reading, the controller 150 detects the leading end of the original document that has passed through the first reading section E with the ejection sensor 114, and then counts the pulse of the document read motor 103.

Subsequently, the controller 150 transmits a gate signal indicating the effective image area in the sub-scanning direction to the second image reader 132 at the time when the leading end of the original document arrives at the second reading section F. The gate signal is continuously transmitted until the trailing end of the original document passes through the second reading section F. After that, the original document that has passed through the second reading section F is conveyed to the sheet ejection section G.

Figure 6:
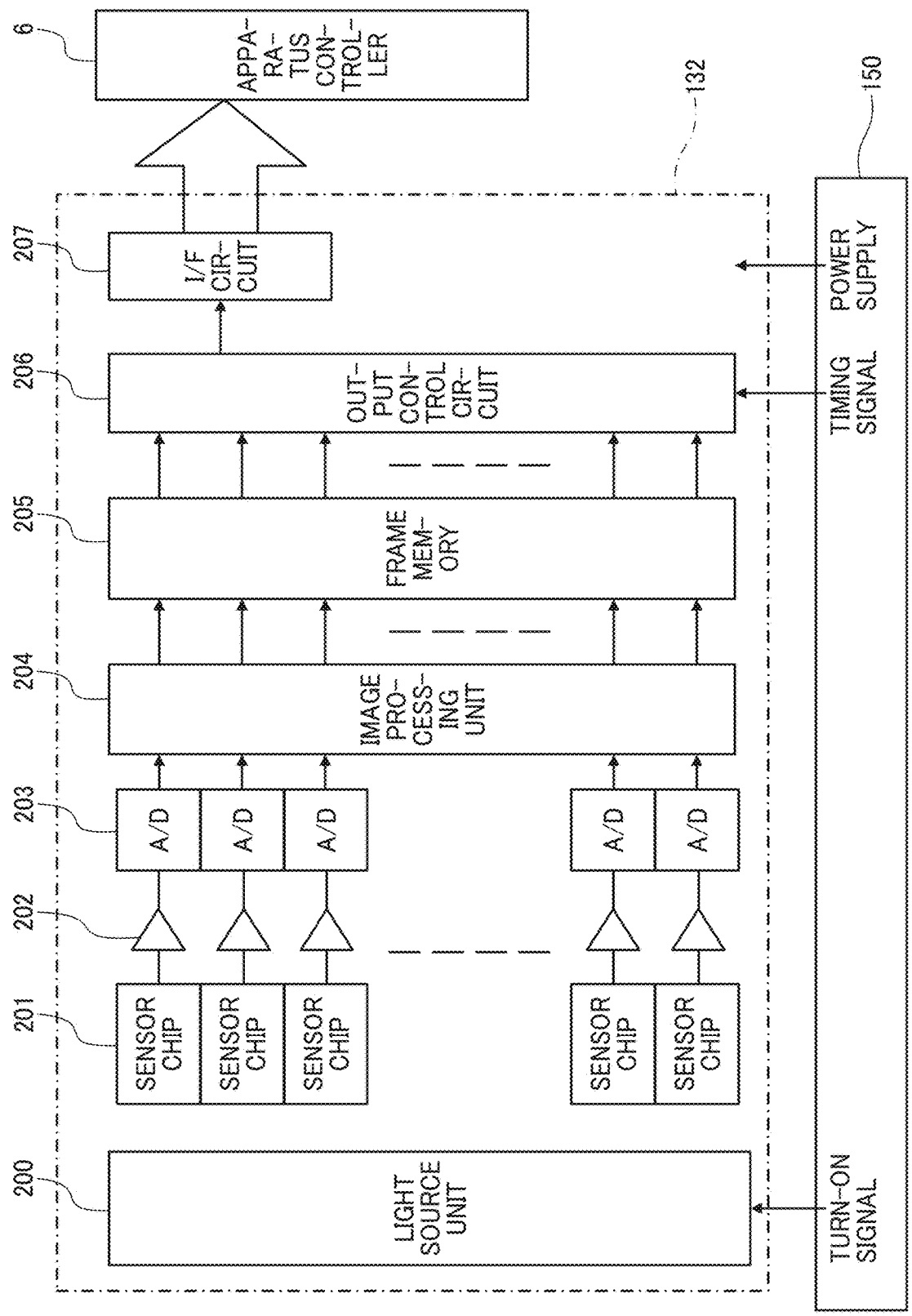
FIG. 6 is a block diagram illustrating part of an electric circuit of a second image reader in an ADF according to an embodiment of the present disclosure.

FIG. 6 is a block diagram illustrating components of an electric circuit of the second image reader 132, according to an embodiment of the present disclosure.

The second image reader 132 includes a light source unit 200 that is formed with an LED array, a fluorescent lamp, a cold cathode tube, or the like. The image forming apparatus also includes a plurality of sensor chips 201 arranged in the main scanning direction (the direction corresponding to the document width direction), a plurality of OP amplifier circuits 202 coupled to the respective sensor chips 201, and a plurality of A/D converters 203 coupled to the respective OP amplifier circuits 202. The image forming apparatus further includes an image processing unit 204, a frame memory 205, an output control circuit 206, and an I/F circuit 207.

Each of the sensor chips 201 includes a photoelectric conversion element that is called as an equal magnification contact image sensor, and a condenser lens. Before the original document enters the reading position at which the second image reader 132 performs reading, a turn-on signal is sent from the controller 150 to the light source unit 200. As a result, the light source unit 200 is turned on, and emits light toward the original document. The light reflected by the original document is condensed onto the photoelectric conversion element by the condenser lens in the plurality of sensor chips 201, and is read as image information. The image information read by each sensor chip 201 is amplified by the OP amplifier circuit 202, and is then converted into digital image information by the A/D converter 203. The digital image information is input to the image processing unit 204, is subjected to shading correction and the like, and is then temporarily stored into the frame memory 205. After that, the digital image information is converted into a data format that can be received by the apparatus controller 6 by the output control circuit 206, and is then output to the apparatus controller 6 via the I/F circuit 207. The controller 150 outputs a timing signal for sending a notification of the timing of the leading end of the original document reaching the position of reading by the second image reader 132 (the image data after the timing will be handled as valid data), a turn-on signal for a light source, a power supply, and the like. Next, the drive transmission device of the ADF 100 is described.

Figure 7:
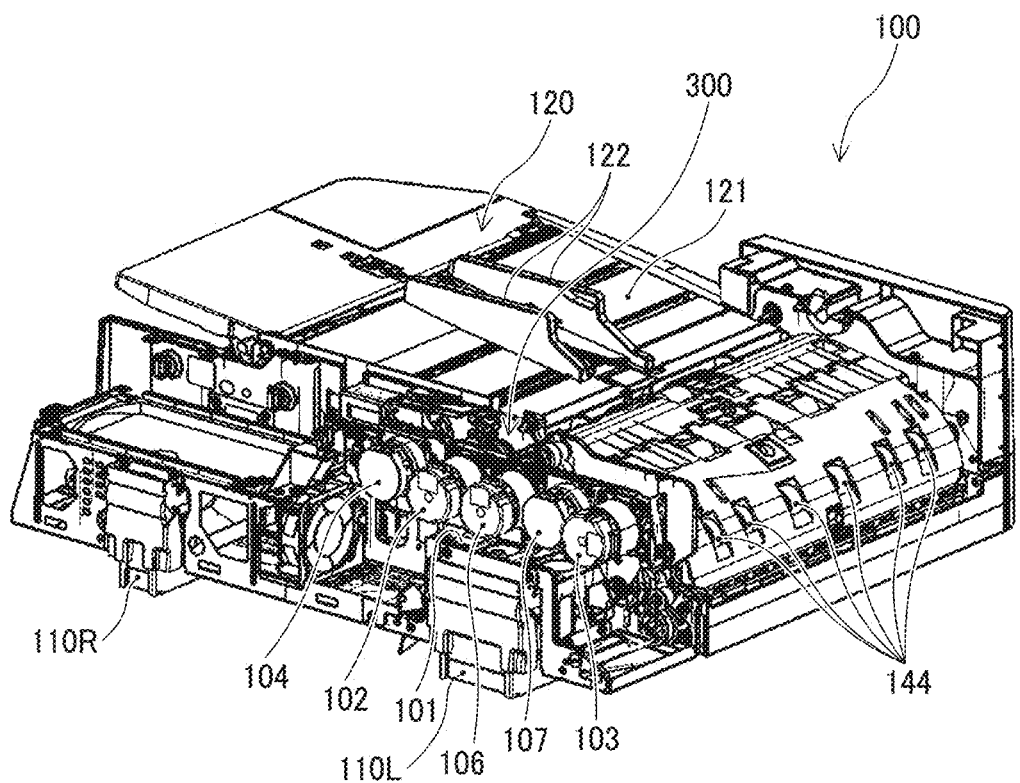
FIG. 7 is a rear perspective view of an ADF according to an embodiment of the present disclosure, illustrating an internal configuration of the ADF.

FIG. 7 is a rear perspective view of the ADF 100, illustrating an internal configuration of the ADF 100 according to an embodiment of the present disclosure.

In FIG. 7, to illustrate the internal configuration of the ADF 100, the exterior cover and the heat transfer prevention cover to be described later are removed.

In the present embodiment, among the seven motors 101 to 107 included in the ADF 100, the base plate lifting motor 105 is disposed on the apparatus front face side, and the remaining six motors 101 to 104, 106, and 107 are disposed on the apparatus back face side. A drive transmission device 300 according to the present embodiment is a device that is disposed on the apparatus back face side, and transmits driving forces of the six motors 101 to 104, 106, and 107 disposed on the apparatus back face side.

Figure 8:
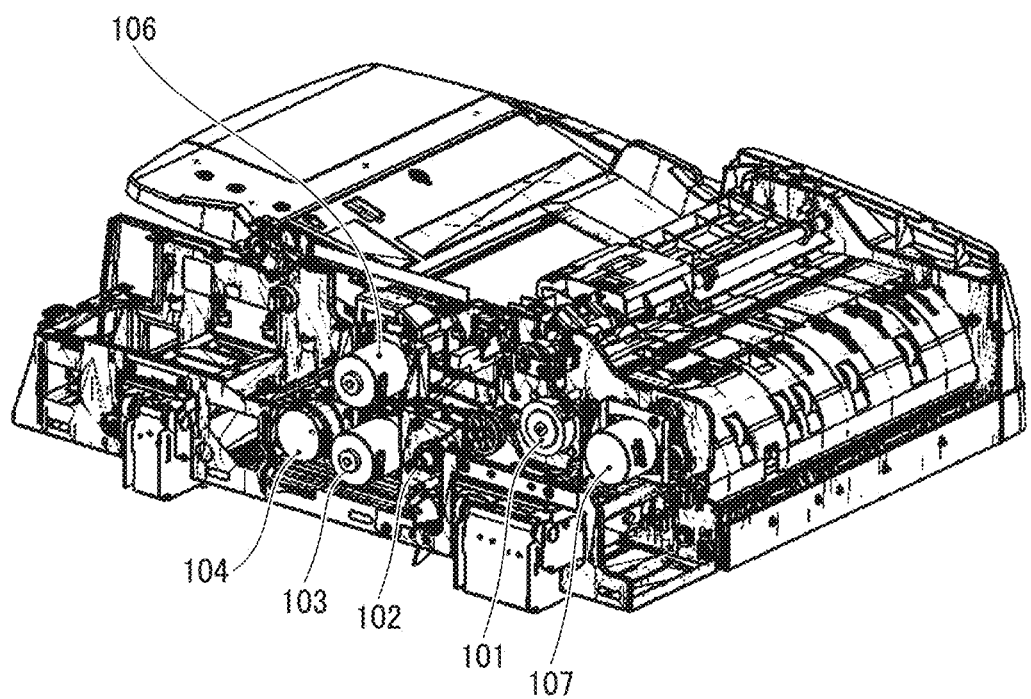
FIG. 8 is a rear perspective view of an ADF according to a comparative example, illustrating an internal configuration of the ADF.

As illustrated in FIG. 7, the six motors 101 to 104, 106, and 107 to which the drive transmission device 300 of the present embodiment transmits driving forces are collectively disposed at one position. Specifically, in a comparative example, the six motors 101 to 104, 106, and 107 are arranged in a dispersed manner as illustrated in FIG. 8, for example. In the present embodiment, on the other hand, these six motors 101 to 104, 106, and 107 are arranged so as to fall within a narrow region.

Figure 9:
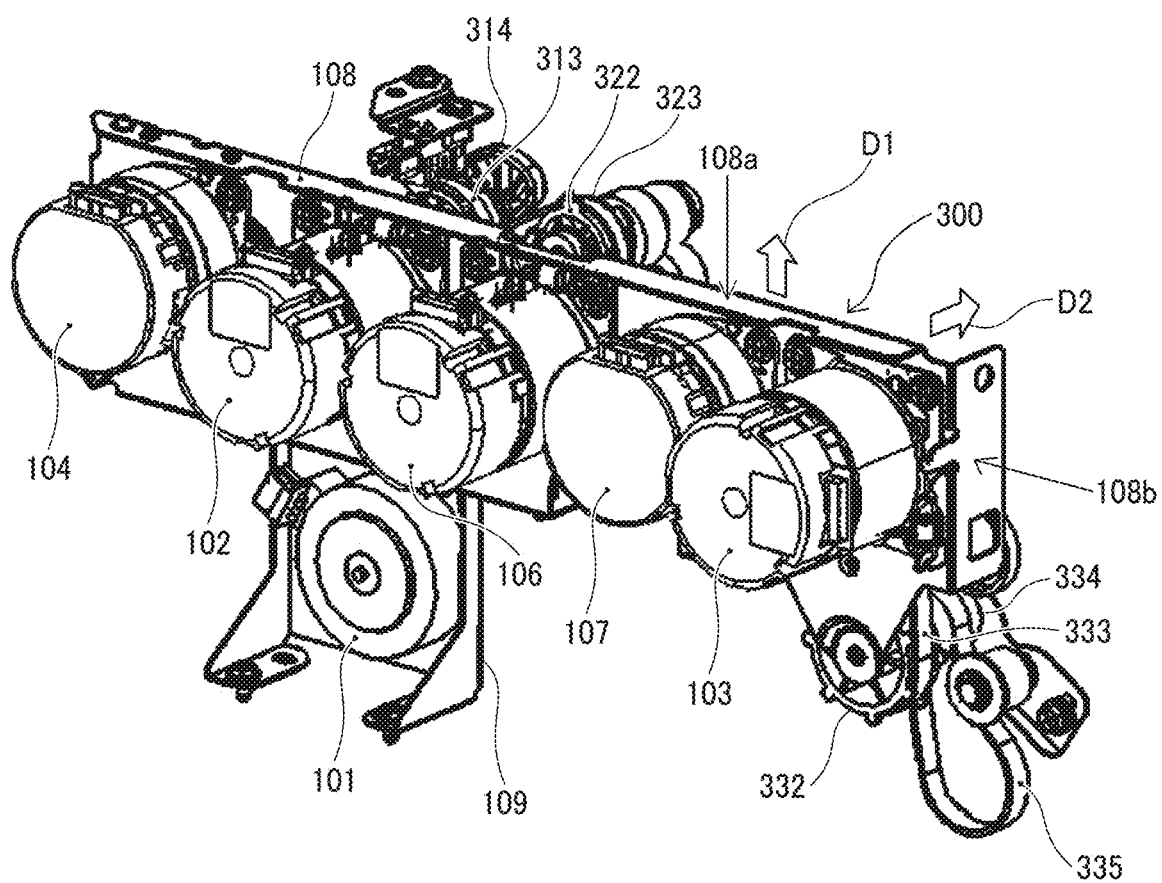
FIG. 9 is a perspective view of a drive transmission device according to an embodiment of the present disclosure, as viewed from the side on which motors are disposed.

FIG. 9 is a perspective view of the drive transmission device 300 according to the present embodiment, as viewed from the motor side on which the motors 101 to 104, 106, and 107 are disposed.

Figure 10:
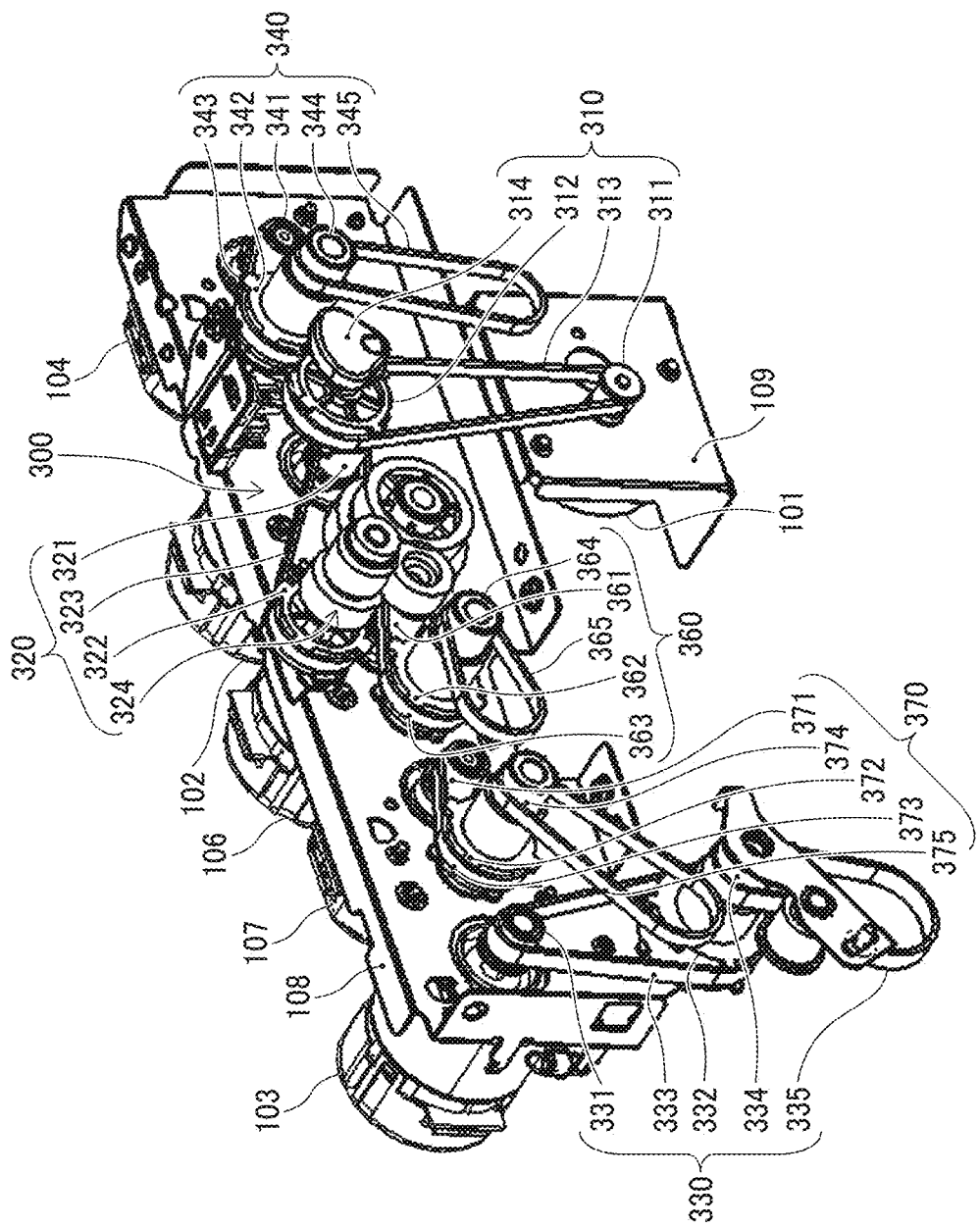
FIG. 10 is a perspective view of the drive transmission device of FIG. 9, as viewed from the side on which drive transmission mechanisms are disposed.

FIG. 10 is a perspective view of the drive transmission device 300 according to the present embodiment, as viewed from the drive transmission mechanism side on which drive transmission mechanisms are disposed.

In FIGS. 9 and 10, the heat transfer prevention cover to be described later is removed.

The drive transmission device 300 according to the present embodiment includes six drive transmission units 310, 320, 330, 340, 360, and 370 that transmit driving forces from the motors 101 to 104, 106, and 107 to driven members such as rollers, using drive transmission mechanisms.

The first drive transmission unit is the drive transmission unit 310 that transmits a driving force from the pickup motor 101 as a drive source to the lifting mechanism of the pickup roller 141 as a driven member, using drive transmission mechanisms 311 to 314. Specifically, as illustrated in FIGS. 11A and 11B, the drive transmission mechanisms of the pickup motor 101 transmit a rotational driving force of a drive pulley 311 attached to the motor shaft of the pickup motor 101 to a driven pulley 312 via a timing belt 313, and rotates a cam 314 attached to the shaft of the driven pulley 312. When the cam 314 rotates, the lifting mechanism of the pickup roller 141 in contact with the cam 314 moves up and down.

Figure 12A:
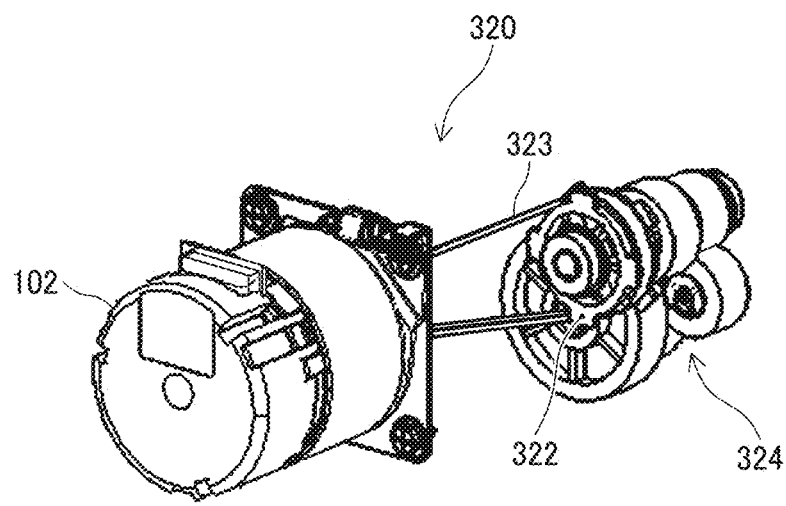
FIG. 12A is a rear perspective view of drive transmission mechanisms of a document feed motor according to an embodiment of the present disclosure.
Figure 12B:
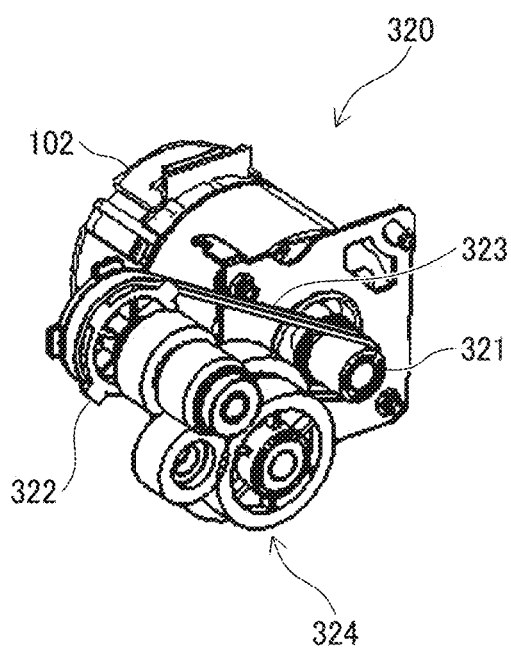
FIG. 12B is a front perspective view of the drive transmission mechanisms of the document feed motor of FIG. 12A.

The second drive transmission unit is the drive transmission unit 320 that transmits a driving force from the document feed motor 102 as a drive source to the pickup roller 141 as a driven member, using drive transmission mechanisms 321 to 324. Specifically, as illustrated in FIGS. 12A and 12B, the drive transmission mechanisms of the document feed motor 102 transmit a rotational driving force of a drive pulley 321 attached to the motor shaft of the document feed motor 102 to a driven pulley 322 via a timing belt 323, and rotates the pickup roller 141 via a gear group 324 interlocked with the driven pulley 322.

Figure 13A:
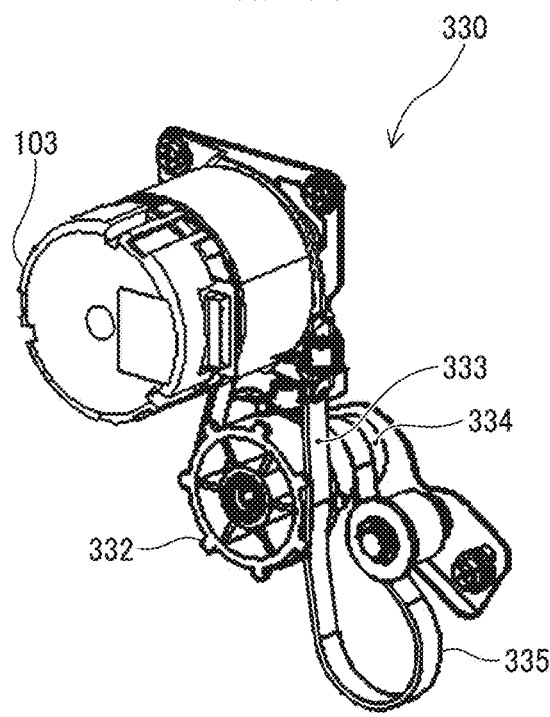
FIG. 13A is a rear perspective view of drive transmission mechanisms of a document read motor according to an embodiment of the present disclosure.
Figure 13B:
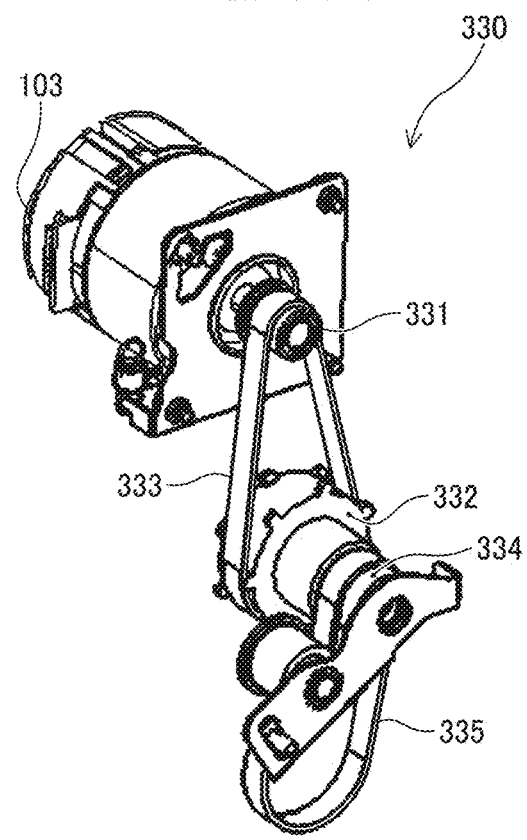
FIG. 13B is a front perspective view of the drive transmission mechanisms of the document read motor of FIG. 13A.

The third drive transmission unit is the drive transmission unit 330 that transmits a driving force from the document read motor 103 as a drive source to the reading entrance roller pair 145, the first reading exit roller pair 146, and the second reading exit roller pair 147 as driven members, using drive transmission mechanisms 331 to 335. Specifically, as illustrated in FIGS. 13A and 13B, the drive transmission mechanisms of the document read motor 103 transmits a rotational driving force of a drive pulley 331 attached to the motor shaft of the document read motor 103 to a driven pulley 332 via a timing belt 333, and rotates a second timing belt 335 stretched around a second drive pulley 334 attached onto the shaft of the driven pulley 332. With this arrangement, the reading entrance roller pair 145, the first reading exit roller pair 146, and the second reading exit roller pair 147 coupled to the second timing belt 335 rotate.

Figure 14A:
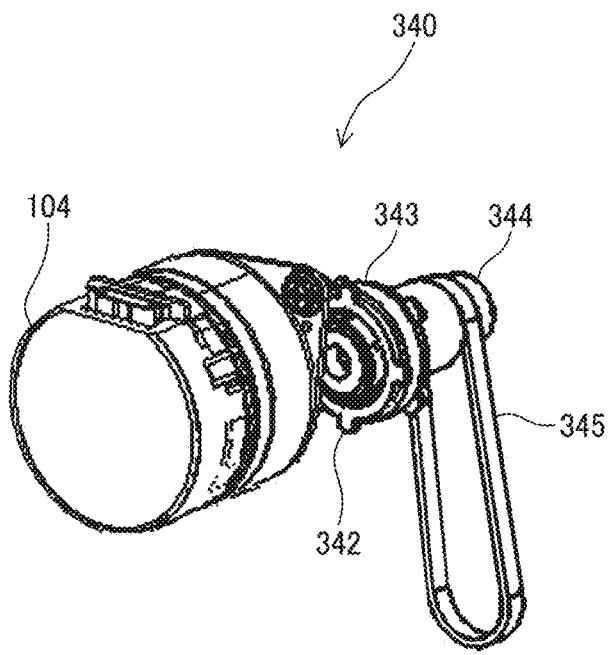
FIG. 14A is a rear perspective view of drive transmission mechanisms of an ejection motor according to an embodiment of the present disclosure.
Figure 14B:
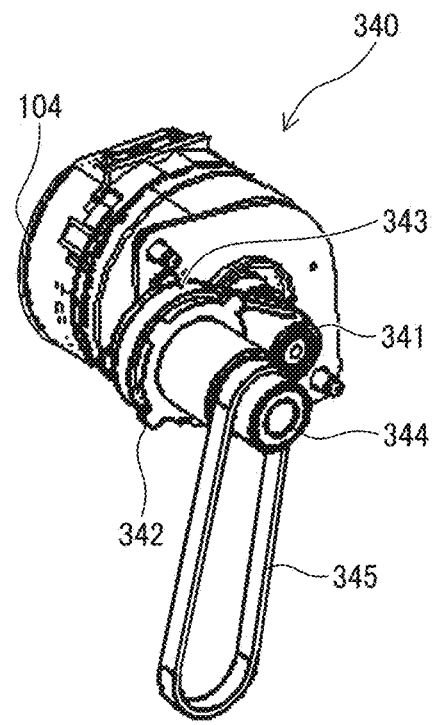
FIG. 14B is a front perspective view of the drive transmission mechanisms of the ejection motor of FOG. 14A.

The fourth drive transmission unit is the drive transmission unit 340 that transmits a driving force from the ejection motor 104 as a drive source to the ejection roller pair 148 as a driven member, using drive transmission mechanisms 341 to 345. Specifically, as illustrated in FIGS. 14A and 14B, the drive transmission mechanisms of the ejection motor 104 transmit a rotational driving force of a drive pulley 341 attached to the motor shaft of the ejection motor 104 to a driven pulley 342 via a timing belt 343, and rotates a second timing belt 345 stretched around a second drive pulley 344 attached onto the shaft of the driven pulley 342. With this arrangement, the ejection roller pair 148 coupled to the second timing belt 345 rotates.

Figure 15A:
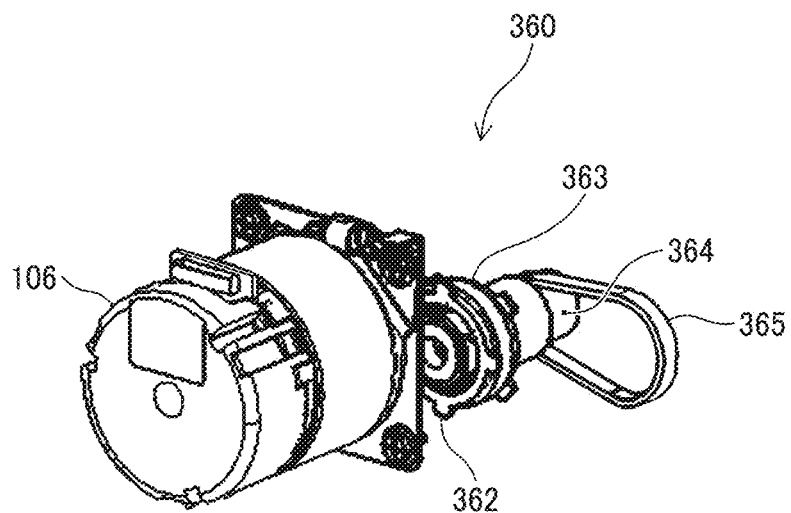
FIG. 15A is a rear perspective view of drive transmission mechanisms of a pullout motor according to an embodiment of the present disclosure.
Figure 15B:
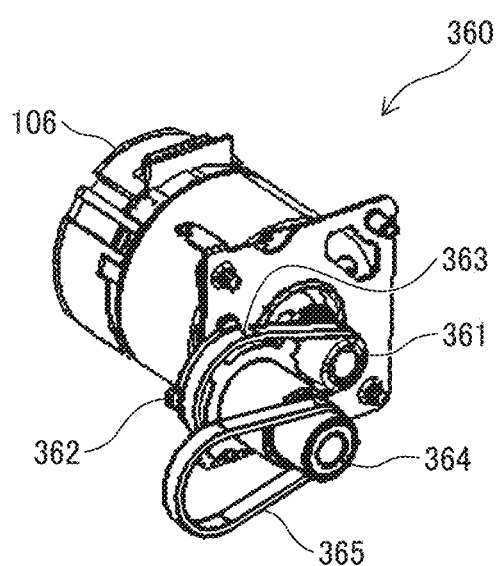
FIG. 15B is a front perspective view of the drive transmission mechanisms of the pullout motor of FIG. 15A.

The fifth drive transmission unit is the drive transmission unit 360 that transmits a driving force from the pullout motor 106 as a drive source to the pullout roller pair 143 as a driven member, using drive transmission mechanisms 361 to 365. Specifically, as illustrated in FIGS. 15A and 15B, the drive transmission mechanisms of the pullout motor 106 transmit a rotational driving force of a drive pulley 361 attached to the motor shaft of the pullout motor 106 to a driven pulley 362 via a timing belt 363, and rotates a second timing belt 365 stretched around a second drive pulley 364 attached onto the shaft of the driven pulley 362. With this arrangement, the pullout roller pair 143 coupled to the second timing belt 365 rotates.

Figure 16A:
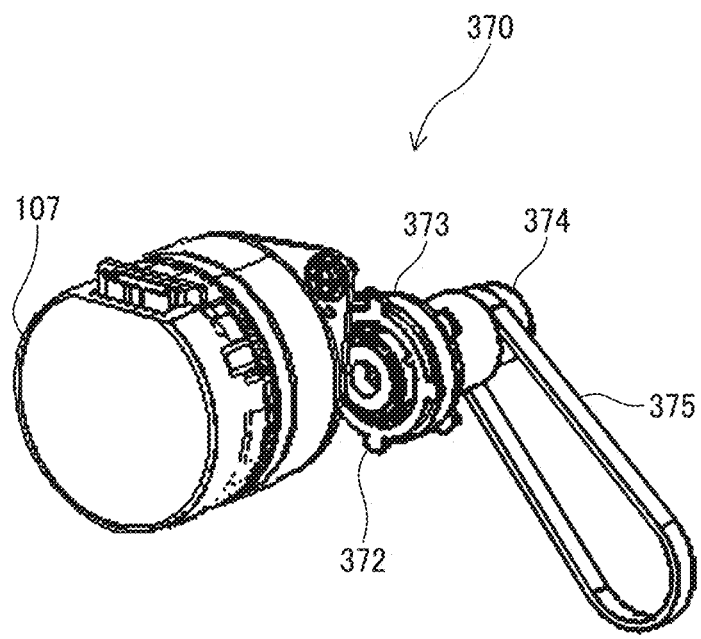
FIG. 16A is a rear perspective view of drive transmission mechanisms of an intermediate motor according to an embodiment of the present disclosure.
Figure 16B:
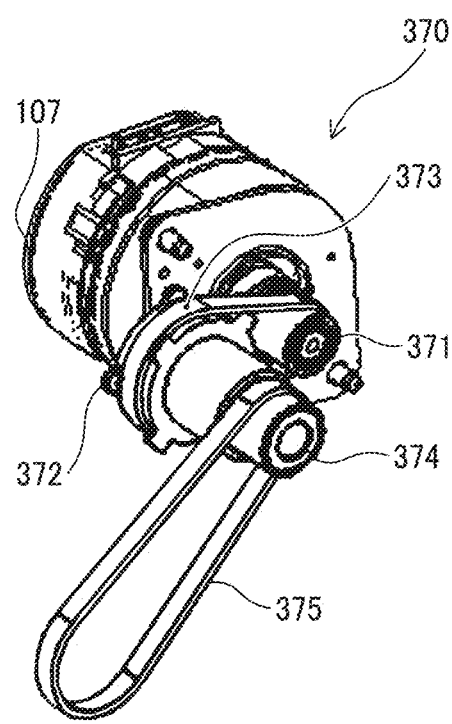
FIG. 16B is a front perspective view of the drive transmission mechanisms of the intermediate motor of FIG. 16A.

The sixth drive transmission unit is the drive transmission unit 370 that transmits a driving force from the intermediate motor 107 as a drive source to the intermediate roller pair 144 as a driven member, using drive transmission mechanism 371 to 375. Specifically, as illustrated in FIGS. 16A and 16B, the drive transmission mechanisms of the intermediate motor 107 transmit a rotational driving force of a drive pulley 371 attached to the motor shaft of the intermediate motor 107 to a driven pulley 372 via a timing belt 373, and rotates a second timing belt 375 stretched around a second drive pulley 374 attached onto the shaft of the driven pulley 372. With this arrangement, the intermediate roller pair 144 coupled to the second timing belt 375 rotates.

In the drive transmission device 300 according to the present embodiment, the drive transmission mechanisms of the respective drive transmission units 310, 320, 330, 340, 360, and 370 are disposed on the opposite side from the motors 101 to 104, 106, and 107. A first motor securing sheet metal 108 and a second motor securing sheet metal 109 that are metal support frames supporting the motors 101 to 104, 106, and 107 are interposed between the drive transmission mechanisms and the motors 101 to 104, 106, and 107. That is, the motors 101 to 104, 106, and 107 are disposed on the same side as one another with respect to the drive transmission mechanisms of the drive transmission units 310, 320, 330, 340, 360, and 370.

Figure 17A:
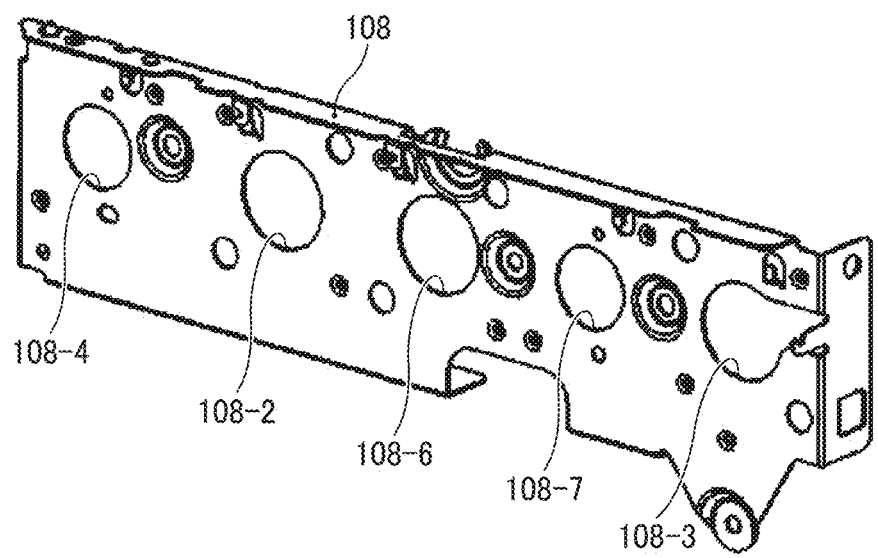
FIG. 17A is a rear perspective view of a first motor securing sheet metal according to an embodiment of the present disclosure.
Figure 17B:
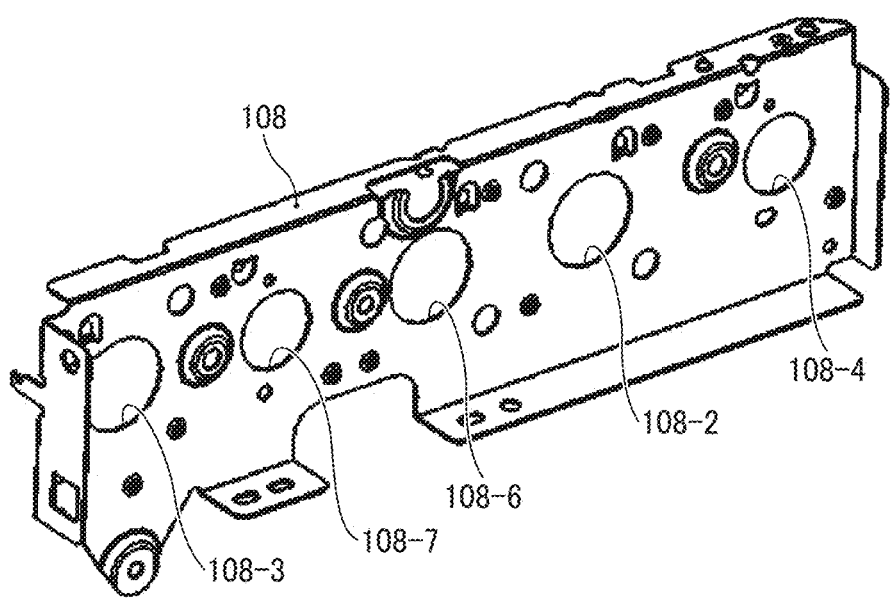
FIG. 17B is a front perspective view of the first motor securing sheet metal of FIG. 17A.

Of these six motors 101 to 104, 106, and 107, five motors 102, 103, 104, 106, and 107 excluding the pickup motor 101 are supported by the single first motor securing sheet metal 108 illustrated in FIGS. 17A and 17B. Specifically, the five motors 102, 103, 104, 106, and 107 are attached to five motor attachment portions 108-2, 108-3, 108-4, 108-6, and 108-7 on the first motor securing sheet metal 108, respectively. With this arrangement, the five motors 102, 103, 104, 106, and 107 of the present embodiment are supported by the first motor securing sheet metal 108 so as to have substantially the same height.

The gears, the pulleys, and the timing belts that are the drive transmission members included in the drive transmission mechanisms of the respective drive transmission units 320, 330, 340, 360, and 370 of the present embodiment are often formed with a material such as a resin having a low heat resistance, or a material such as a thermosoftening resin. Because of this, when the motors 102, 103, 104, 106, and 107 generate heat for some reason, the heat might be conducted to the gears, the pulleys, and the timing belts. Therefore, the drive transmission device 300 has a configuration for preventing heat transfer.

To lower costs, a preferred configuration for preventing heat transfer is a configuration in which the drive transmission mechanisms of the respective drive transmission units 320, 330, 340, 360, and 370 are covered with a heat-resistant member (such as a metallic member or a heat-resistant resin member), for example, and thus, are shielded from the motors 102, 103, 104, 106, and 107. The heat-resistant member mentioned herein is at least a member having a higher heat resistance than the drive transmission member having the lowest heat resistance among the drive transmission members included in the drive transmission mechanisms of a plurality of drive transmission units 320, 330, 340, 360, and 370.

Figure 18:
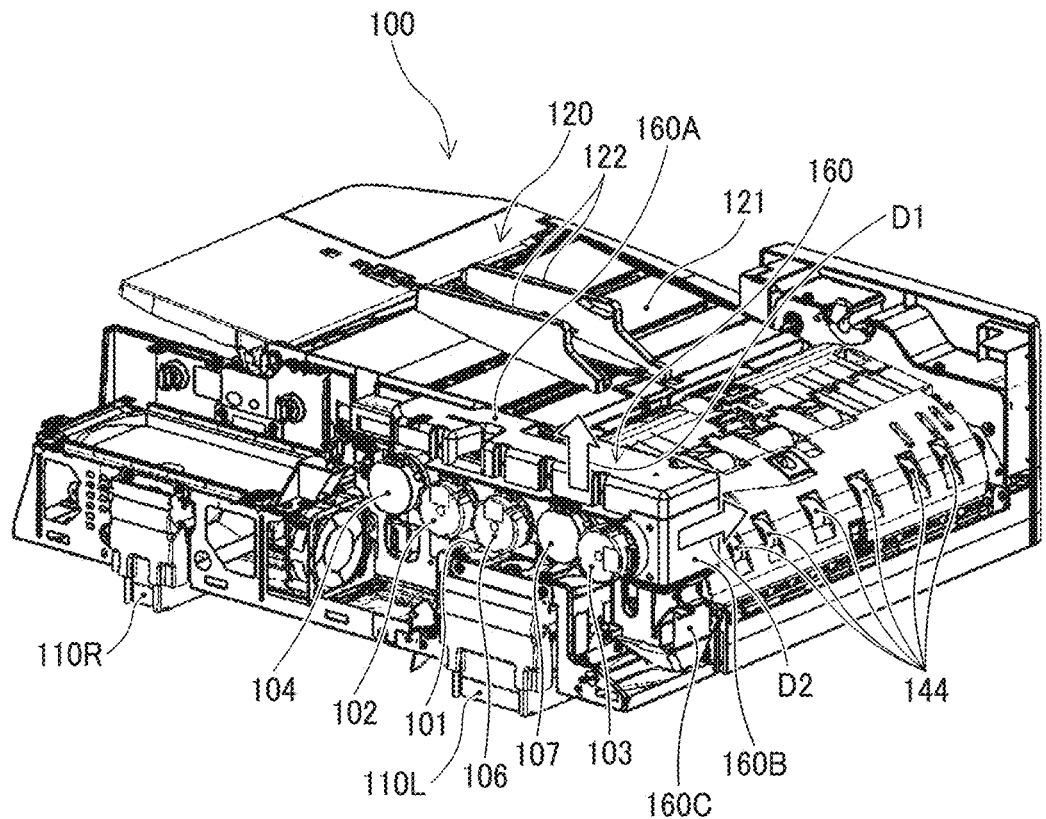
FIG. 18 is a rear perspective view of an ADF according to an embodiment of the present disclosure, illustrating an internal configuration of the ADF to which a heat transfer prevention cover is attached.

FIG. 18 is a rear perspective view of the ADF 100, illustrating the internal configuration of the ADF 100 to which a heat transfer prevention cover 160 that is a heat-resistant member according to the present embodiment is attached.

Figure 19:
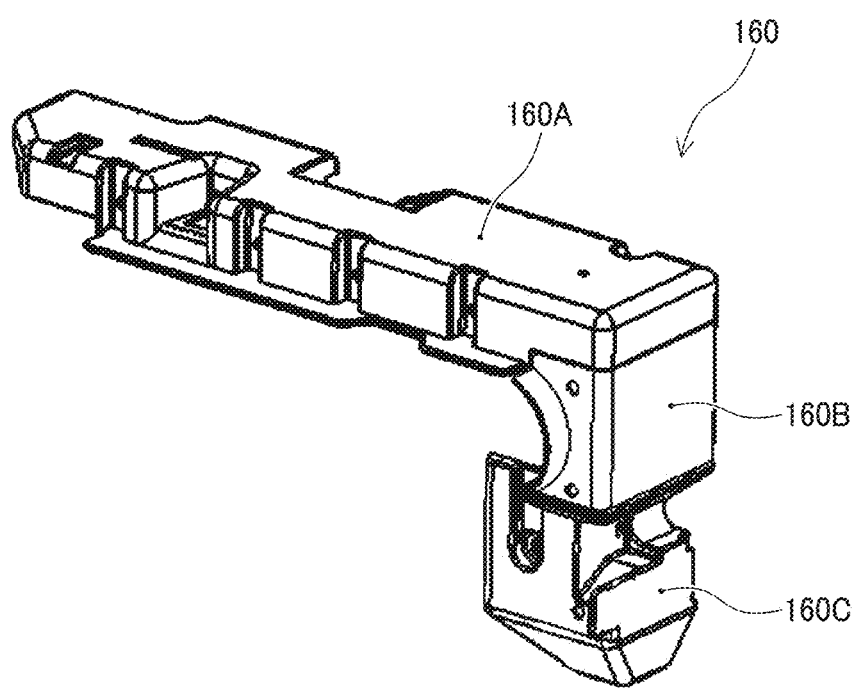
FIG. 19 is a perspective view of the heat transfer prevention cover of FIG. 18.

FIG. 19 is a perspective view of the heat transfer prevention cover 160 according to the present embodiment.

The configuration for preventing heat transfer according to the present embodiment is a configuration in which predetermined portions of the drive transmission mechanisms of the respective drive transmission units 320, 330, 340, 360, and 370 are covered with the heat transfer prevention cover 160, which is a heat-resistant member, so that the drive transmission mechanisms are shielded from the five motors 102, 103, 104, 106, and 107 by the heat transfer prevention cover 160 to lower the costs.

In the drive transmission device according to the comparative example, the five motors 102, 103, 104, 106, and 107 are arranged in a dispersed manner, as illustrated in FIG. 8. In such a case, it is necessary to prepare a heat-resistant member (a heat transfer prevention cover or the like) having a structure that can cover each of the drive transmission mechanisms corresponding to the respective motors 102, 103, 104, 106, and 107. Moreover, it is also necessary to perform an operation of attaching these heat-resistant members (heat transfer prevention covers or the like) to the respective drive transmission mechanisms. This leads to an increase in cost.

Therefore, in the present embodiment, the five motors 102, 103, 104, 106, and 107 included in the five drive transmission units 320, 330, 340, 360, and 370 among the six drive transmission units 310, 320, 330, 340, 360, and 370 are disposed close to one another at substantially the same height and on the same side with respect to the drive transmission mechanisms as described above. As the five motors 102, 103, 104, 106, and 107 are collectively disposed at one position in this manner, the drive transmission mechanisms can be shielded from the five motors 102, 103, 104, 106, and 107 by a single or a small number of heat transfer prevention covers 160.

Here, heat transfer due to heat generation of the motors spreads upward from the motors. Therefore, to effectively prevent heat transfer due to heat generation of the five motors 102, 103, 104, 106, and 107 from reaching the drive transmission mechanisms with a heat-resistant member (a heat transfer prevention cover or the like), it is necessary to dispose the heat-resistant member at a position at which the heat-resistant member can be located higher than these five motors 102, 103, 104, 106, and 107 during use.

In the present embodiment, the five motors 102, 103, 104, 106, and 107 are disposed at substantially the same height. Accordingly, the region above the five motors for which a heat-resistant member is to be disposed is a substantially flat region (a region substantially parallel to the horizontal plane) in the alignment direction of the five motors (substantially the horizontal direction). Because of this, the shape of the heat transfer prevention cover 160 can be made simpler than in a configuration in which the five motors 102, 103, 104, 106, and 107 are arranged at different heights, and the size of the heat transfer prevention cover 160 can also be made smaller. Thus, the manufacturing costs and the assembly costs of the heat transfer prevention cover 160 can be lowered.

The heat transfer prevention cover 160 of the present embodiment has a configuration divided into the three parts of an upper cover 160A, a middle cover 160B, and a lower cover 160C, to ensure ease of manufacturing a mold for the heat transfer prevention cover and ease of assembling the heat transfer prevention cover. The upper cover 160A, the middle cover 160B, and the lower cover 160C can be attached individually of one another.

As described above, the ADF 100 to which the drive transmission device according to the present embodiment is attached is rotatable (openable and closable) via the hinge members 110R and 110L, and can be opened within an angular range of approximately 90° from the closed state illustrated in FIG. 18. That is, the end portion of the ADF 100 located on the apparatus front face side in the closed state is moved to face substantially upward when opened to the maximum. Therefore, in a use state in which the ADF 100 is closed, which is one of the use states according to the present embodiment, the direction indicated by arrow D1 in FIGS. 9 and 18 is the upward direction with respect to the five motors 102, 103, 104, 106, and 107. In a use state in which the ADF 100 is open, which is another use state according to the present embodiment, the direction indicated by arrow D2 in FIGS. 9 and 18 is the upward direction with respect to the five motors 102, 103, 104, 106, and 107.

In the use state in which the ADF 100 is closed, the drive transmission mechanisms are located laterally with respect to the five motors 102, 103, 104, 106, and 107, and the first motor securing sheet metal 108 formed with a metal is located in between. However, there is a possibility that heat generated by the motors is thermally transferred upward, goes around the upper end 108a of the first motor securing sheet metal 108 formed with a metal, and is thermally transferred to the drive transmission mechanisms. The heat transfer prevention cover 160 according to the present embodiment is provided so as to cover the drive transmission mechanisms at a portion above the upper end 108a of the first motor securing sheet metal 108 formed with a metal in a use state in which the ADF 100 is closed. Specifically, in the use state in which the ADF 100 is closed, the upper cover 160A of the heat transfer prevention cover 160 mainly covers the drive transmission mechanisms located above the upper end 108a of the first motor securing sheet metal 108, and shields the drive transmission mechanisms from the five motors 102, 103, 104, 106, and 107. Thus, even when heat is generated by the motors in the use state in which the ADF 100 is closed, and heat transfer spreads to the upper side of the motors, heat transfer to the drive transmission mechanisms shielded by the upper cover 160A of the heat transfer prevention cover 160 is prevented.

In the use state in which the ADF 100 is open, the drive transmission mechanisms are located above (almost immediately above) the five motors 102, 103, 104, 106, and 107, and the first motor securing sheet metal 108 formed with a metal is located in between. In this case, there is a possibility that heat generated by the motors is transferred upward, goes around the peripheral portion of the first motor securing sheet metal 108 formed with a metal, and is transferred to the drive transmission mechanisms. In particular, in the configuration according to the present embodiment, the drive transmission mechanisms 331 to 335 of the drive transmission unit 330 are disposed near the left end 108b of the first motor securing sheet metal 108 and the lower end portion of the first motor securing sheet metal 108 near the left end 108b. Therefore, there is a possibility that heat generated by the motors spreads from there, and causes heat transfer.

To prevent that, the heat transfer prevention cover 160 according to the present embodiment is provided so as to cover the drive transmission mechanisms at a portion above the plate face of the first motor securing sheet metal 108 formed with a metal in the use state in which the ADF 100 is open. Specifically, in the use state in which the ADF 100 is open, the upper cover 160A of the heat transfer prevention cover 160 covers the drive transmission mechanisms in a portion above the upper end 108a of the first motor securing sheet metal 108. Also, the middle cover 160B of the heat transfer prevention cover 160 covers the drive transmission mechanisms in a portion above the left end 108b of the first motor securing sheet metal 108, and the lower cover 160C of the heat transfer prevention cover 160 covers the drive transmission mechanisms in a portion above the lower end (the lower end portion in the vicinity of the left end 108b) of the first motor securing sheet metal 108, to shield the drive transmission mechanisms from the five motors 102, 103, 104, 106, and 107. With this arrangement, even if heat generation from the motors occurs in the use state in which the ADF 100 is open, and heat transfer spreads to the upper side of the motors, heat transfer to the drive transmission mechanisms shielded by the covers 160A, 160B, and 160C of the heat transfer prevention cover 160 is prevented.

In the present embodiment, at least part of the drive transmission mechanisms is covered with the heat transfer prevention cover 160. This is also useful as countermeasures against noise generated from the drive transmission mechanisms. In particular, a sound absorbing material is provided on the inner side of the heat transfer prevention cover 160 (the side facing the drive transmission mechanisms), so that the effect of the noise control measures can be enhanced.

Further, in the present embodiment, as illustrated in FIGS. 7 and 18, at least one of the five motors 102, 103, 104, 106, and 107 is disposed so that the position of the hinge member 110L in the rotation axis direction overlaps the hinge member 110L on the left side of the apparatus, and is located higher in the use state in which the ADF 100 is open. With this arrangement, in the use state in which the ADF 100 is open, the weight of the five motors 102, 103, 104, 106, and 107 having a relatively large weight can be received by the hinge member 110L located below the motors. Thus, twisting of the ADF 100 hardly occurs when the ADF 100 is opened and closed.

In the present embodiment, the drive transmission device provided in the ADF 100, which is an image reading device, has been described as an example. However, embodiments of the present disclosure are not limited to this. Any drive transmission device that includes a plurality of drive transmission units that transmit driving forces from drive sources to driven members with the use of drive transmission mechanisms can also be adopted as a drive transmission device in the image forming device 3 of the image forming apparatus, for example.

The above-described embodiments and advantageous effects are merely examples, and for example, the following effects can be obtained in the aspects described below.

First Aspect

According to a first aspect, a drive transmission device (e.g., the drive transmission device 300) includes a plurality of drive transmission units (e.g., the drive transmission units 310, 320, 330, 340, 360, and 370) to transmit driving forces from drive sources (e.g., the motors 101 to 104, 106, and 107) to driven members (e.g., the lifting mechanism of the pickup roller 141, the pickup roller 141, the reading entrance roller pair 145, the ejection roller pair 148, the pullout roller pair 143, and the intermediate roller pair 144) using drive transmission mechanisms. In the drive transmission device (e.g., the drive transmission device 300), two or more drive sources (e.g., the motors 102, 103, 104, 106, and 107) included in two or more drive transmission units (e.g., the drive transmission units 320, 330, 340, 360, and 370) among the plurality of drive transmission units are disposed at substantially the same height and on the same side with respect to the two or more drive transmission mechanisms corresponding to the two or more drive sources, and a heat-resistant member (e.g., the heat transfer prevention cover 160) is disposed at a position above the two or more drive sources in a use state and at a position at which the heat-resistant member shields the drive transmission mechanisms from the two or more drive sources.

Typically, a drive transmission member such as a gear or a timing belt included in a drive transmission mechanism is often formed with a material having a low heat resistance or a thermosoftening material. Because of this, there is a possibility that the drive transmission member conducts heat at a time of heat generation from a drive source, and therefore, the drive transmission device has a configuration for preventing heat transfer.

To lower costs, a preferred configuration for preventing heat transfer is a configuration in which drive transmission mechanisms are covered with a heat-resistant member (such as a heat transfer prevention cover), so that the drive transmission mechanisms are shielded from drive sources by the heat-resistant member.

In a drive transmission device including a plurality of drive transmission units, however, if a plurality of drive sources included in the respective drive transmission units is arranged in a dispersed manner, an individual heat-resistant member that can be attached to each corresponding drive transmission unit is prepared, and these heat-resistant members are attached to the respective drive transmission units. This process leads to an increase in cost.

In the present aspect, two or more drive sources included in two or more drive transmission units of a plurality of drive transmission units are disposed at substantially same height and on the same side with respect to two or more drive transmission mechanisms corresponding to the two or more drive sources. As the two or more drive sources are collectively disposed for the drive transmission mechanisms in this manner, the drive transmission mechanisms can be shielded from the two or more drive sources by a single or a small number of heat-resistant members.

In particular, heat conduction due to heat generated by the two or more drive sources spreads upward from the drive sources. Therefore, to effectively prevent heat transfer due to heat generation by the two or more drive sources from spreading to the drive transmission mechanisms with the use of a heat-resistant member in a case where at least part of the drive transmission mechanisms is located at a higher position than the drive sources in a use state, it is necessary to dispose the heat-resistant member at a position at which the heat-resistant member can be located higher than the two or more drive sources in a use state. If the two or more drive sources are disposed at substantially the same height, a region above the two or more drive sources for which the heat-resistant member is to be provided is a substantially flat region (substantially parallel to the horizontal plane) in the direction in which the two or more drive sources are arranged. With this arrangement, the shape of the heat-resistant member can be made simpler, and the size of the heat-resistant member can be made smaller than in a configuration in which the two or more drive sources are disposed at different heights. Thus, the manufacturing costs and the assembly costs of the heat-resistant member can be lowered.

Accordingly, a configuration for preventing heat transfer to the drive transmission mechanisms at a time of heat generation from the two or more drive sources can be obtained at lower costs.

Second Aspect

According to a second aspect, in the drive transmission device of the first aspect, the two or more drive transmission units and the heat-resistant member are mounted on a rotary member (e.g., the ADF 100) together with the two or more drive sources, and the mounting positions of the two or more drive sources, the two or more drive transmission units, and the heat-resistant member are set so that the heat-resistant member is located higher than the two or more drive sources and shields the drive transmission mechanisms from the two or more drive sources, within a range of a position change with rotation of the rotary member.

According to this aspect, the heat-resistant member is disposed at a position at which the heat-resistant member can be located higher than the two or more drive sources depending on rotation of the rotary member, so as to shield the drive transmission mechanisms from the two or more drive sources. Thus, even in a case where at least part of the drive transmission mechanisms might be located higher than the drive sources depending on rotation of the rotary member, it is possible to effectively prevent heat transfer to the drive transmission mechanisms at a time of heat generation from the two or more drive sources.

Third Aspect

According to a third aspect, in the drive transmission device of the second aspect, at least one of the two or more drive sources is disposed so that the position of the at least one of the two or more drive sources in the rotation axis direction overlaps a hinge portion (e.g., the hinge member 110L) that rotatably supports the rotary member, and is located higher within the rotation range of the rotary member.

According to this aspect, the weight of the two or more drive sources having a relatively large weight can be received by the hinge portion located below the two or more drive sources. Thus, twisting of the rotary member during rotation of the rotary member can be prevented as much as possible.

Fourth Aspect

According to a fourth aspect, in the drive transmission device of any one of the first to third aspects, the drive transmission mechanisms each include a gear, a pulley, or a timing belt.

These gears, pulleys, or timing belts are often formed with a material such as a resin having a low heat resistance or a material such as a thermosoftening resin, and therefore, heat transfer easily occurs. According to the present aspect, in a drive transmission device in which heat transfer is likely to occur as described above, a configuration for preventing heat transfer can be formed at low costs.

Fifth Aspect

According to a fifth aspect, in the drive transmission device of any one of the first to fourth aspects, the two or more drive sources are supported by the same support frame (e.g., the first motor securing sheet metal 108), and the heat-resistant member is disposed together with the support frame at the position at which the two or more drive transmission mechanisms are shielded from the two or more drive sources by the heat-resistant member.

In the present aspect, the two or more drive sources are disposed so close to each other as to be supported by the same support frame, and a configuration for preventing heat transfer to the drive transmission mechanisms at a time of heat generation from the two or more drive sources can be formed at lower costs. In particular, when the support frame that supports the drive sources is formed with a heat-resistant material such as a metal, the heat-resistant member is disposed to shield a region outside the support frame. Thus, the size of the shape of the heat-resistant member can be made smaller, and the manufacturing costs of the heat-resistant member can be reduced.

Sixth Aspect

According to a sixth aspect, an image reading device includes the drive transmission device of any one of the first to fifth aspects.

According to this aspect, it is possible to provide an image reading device that can have a configuration for preventing heat transfer to the drive transmission mechanisms at a time of heat generation from the two or more drive sources at low costs.

Seventh Aspect

According to a seventh aspect, an image forming apparatus includes the drive transmission device of any one of the first to fifth aspects.

According to this aspect, it is possible to provide an image forming apparatus that can have a configuration for preventing heat transfer to the drive transmission mechanisms at a time of heat generation from the two or more drive sources at low costs.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:
1. A drive transmission device, comprising:
a plurality of drive transmission units including:
a plurality of drive sources; and
a plurality of drive transmission mechanisms to transmit drive force from the plurality of drive sources to a driven member,
at least two drive sources of the plurality of drive sources being included in at least two drive transmission units of the plurality of drive transmission units,
the at least two drive sources being disposed at substantially a same height and on a same side with respect to at least two drive transmission mechanisms of the plurality of drive transmission mechanisms that correspond to the at least two drive sources; and
a heat-resistant member disposed at a position higher than the at least two drive sources in a use state, the at least two drive transmission mechanisms being shielded from the at least two drive sources by the heat-resistant member at the position.

2. The drive transmission device of claim 1,
wherein the at least two drive transmission units and the heat-resistant member are mounted on a rotary member together with the at least two drive sources, and
mounting positions of the at least two drive sources, the at least two drive transmission units, and the heat-resistant member are set so that the heat-resistant member is located at the position higher than the at least two drive sources shields the at least two drive transmission mechanisms from the at least two drive sources, within a range of a position change with rotation of the rotary member.

3. The drive transmission device of claim 2,
wherein at least one of the at least two drive sources is disposed to overlap with a position of a hinge portion in a rotation axis direction of the hinge portion and to be located higher than the hinge portion within a rotation range of the rotary member, the hinge portion rotatably supporting the rotary member.

4. The drive transmission device of claim 1,
wherein the plurality of drive transmission mechanisms includes at least one of a gear, a pulley, or a timing belt.

5. The drive transmission device of claim 1, further comprising a support frame supporting the at least two drive sources,
wherein the heat-resistant member is disposed together with the support frame at the position at which the heat-resistant member shields the at least two drive transmission mechanisms from the at least two drive sources.

6. An image reading device, comprising the drive transmission device of claim 1.

7. An image forming apparatus, comprising the drive transmission device of claim 1.

* * * * *